United States Patent [19]

Shin et al.

[11] Patent Number: 5,723,838

[45] Date of Patent: Mar. 3, 1998

[54] METHOD FOR TREATING INCINERATOR EFFLUENT GAS

[75] Inventors: Byung-chul Shin, Kyunggi-Do; Keun-hoo Lee, Seoul; Bum-Soo Han; Ki-Hun Joh, both of Taejon, all of Rep. of Korea

[73] Assignees: Samsung Engineering Co., Ltd.; Samsung Heavy Industries Co., Ltd., both of Seoul, Rep. of Korea

[21] Appl. No.: 721,055

[22] Filed: Sep. 26, 1996

[30] Foreign Application Priority Data

Oct. 4, 1995 [KR] Rep. of Korea ............... 95-33808

[51] Int. Cl.$^6$ ............... B01D 53/00; C01B 21/00; C01B 17/00; B01J 8/00
[52] U.S. Cl. ............... 204/157.3; 204/157.43; 204/157.4; 204/157.49; 204/157.5; 204/158.2; 423/243.08; 423/244.07
[58] Field of Search ............... 204/157.3, 157.43, 204/157.46, 157.49, 157.5, 158.2; 423/243.08, 244.07

[56] References Cited

U.S. PATENT DOCUMENTS

| | | | |
|---|---|---|---|
| 4,372,832 | 2/1983 | Bush | 204/157.46 |
| 4,882,020 | 11/1989 | Maezawa et al. | 204/157.3 |
| 5,108,565 | 4/1992 | Machi et al. | 204/157.3 |

*Primary Examiner*—Kathryn L. Gorgos
*Assistant Examiner*—Edna Wong
*Attorney, Agent, or Firm*—Browdy and Neimark

[57] ABSTRACT

Electron beam irradiation step is followed by alkaline material atomizing step in the present invention. Since irradiation step and alkaline material atomizing step is conducted in different time and in different reactors, the construction cost of X-ray shielding concrete is decreased remarkably. If the humidity of incinerator effluent gas is more than 100 g/Nm$^3$ in dry basis by adding a steam of 110°~200° C., harmful substances are efficiently removed by electron beam irradiation. As a result, it is possible to realize a space-saving equipment, a reduction of required energy, a simple operation controlling, and a prevention of occurrence of secondary environment pollution.

14 Claims, 5 Drawing Sheets

METHOD FOR TREATING INCINERATOR EFFLUENT GAS

BACKGROUND OF THE INVENTION

1. [Field of the Invention]

The present invention relates to a method of removing harmful gases from an incinerator effluent gas.

2. [Description of the Related Art]

An incinerator effluent gas contains harmful gases including nitrogen oxides, sulfur oxides, hydrogen chlorides, organo-chloric compounds and the like—all generated from nitrogen, sulfur and chlorine which exist in the refuse. The contents of the first three of these harmful substances are regulated by the law. In order to prevent secondary pollution which may occur due to these oxides existing in air, and to protect the health of people and preserve their environment, the harmful gases must be removed more efficiently from the incinerator effluent gas. The standards of disposing refuse have actually been made more stringent. And more complex gas-removing processes than the conventional ones are applied in practice. There are two procedures generally employed to remove nitrogen oxides, sulfur oxides, and hydrogen oxides from an incinerator effluent gas. The first is a wet process, and the second is a semi-dry process.

FIG. 2 shows the wet process (a) Dust in the exhaust gas is removed in a dust collector.

(b) $NH_3$ gas is blown and the resulting gas is led into a catalytic reactor to reduce nitrogen oxides, and the nitrogen oxides are removed by reducing in accordance with a reaction formula represented by following.

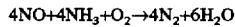

(c) The exhaust gas is washed to remove hydrogen chloride and sulfur oxides using a large amount of water and NaOH solution or CaCl2 solution in accordance with a reaction formula represented by following.

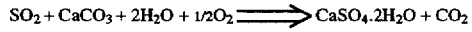

There are following problems in the wet process as shown in FIG. 2.

First, a large amount of water of 0.7 m³ per 1 t of refuse is needed as a makeup water for washing gas in the desulfurization/denitrification reactor to remove hydrogen chloride and sulfur oxides.

Second, since the washed water contains three to five times salting concentration as sea water, it is not possible to make a wastewater treatment directly. Therefore, about 0.6 m³ dilution water is needed every 1 t of refuse.

Third, in the reheater for solving the above mentioned problems caused by the fact that the gas temperature after washing is low, a large amount of heating energy is needed.

And, a complicated equipment for wastewater treatment is needed.

FIG. 3 shows the semi-dry process.

(a) $Ca(OH)_2$ slurry is blown from the top portion of an atomizing reactor for removing hydrogen chloride and sulfur oxides as the alkaline material, wherein such slurry is atomized finely to diffuse within the reactor, thereby removing hydrogen chloride and sulfur oxides by neutralizing in accordance with reaction formulas represented by the following.

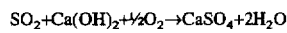

(b) Salt which is a solid state product produced by the above mentioned formulas is removed and recovered by the dust collector. And, $NH_3$ gas is blown, and the resulting gas is led into the catalytic reactor to reduce and remove the nitrogen oxides in accordance with the following formula.

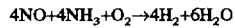

There are following problems in the semi-dry process as shown in FIG. 3.

First, since the gas temperature has to be heated to more than about 250° C. in order to prevent bindings between catalyst layers in the catalytic reactor for reducing the nitrogen oxides, a boiler recovery of heating energy has to be restricted. The bindings are caused by producing an acid ammonium sulfate, which leads to an unstable operation.

Second, since the catalyst to be used is very expensive and it has to be changed or reproduced periodically, the maintenance is very complicated.

Third, in order to have the structure for preventing bindings, the volume for the device of catalyst layer has to be large. And, since the gas temperature is high(about 250° C.), the volume for the device of the dust collector 3 is large.

Effluent gas treating methods using electron beam irradiation have some advantages. One is that desulfurization procedure and denitrification procedure are simultaneously conducted in one reactor. Since it is dry process, it generates no waste water and secondary pollutants. Further, it is possible to remove the hydrogen chloride and uncombusted organic substances efficiently.

Denitrification and desulfurization method of effluent gas using electron beam irradiation is shown in U.S. Pat. No. 4,882,020 in case of where effluent gas from incinerator boiler is washed and cooled to 60° C.–80° C. by spraying water in a cooling tower. Then, NH gas is blown and the resulting gas is led into an electron beam irradiation reactor to be irradiated. When the effluent gas reacts with $NH_3$ gas, sulfur dioxide gas and nitrogen oxides are simultaneously removed. The method which is shown by U.S. Pat. No. 4,882,020 is adequate to treat power plants flue gas which does not includes harmful substances such as hydrogen chloride and heavy metals. However, the above method is not adequate for treating urban wastes or industrial wastes which includes the various harmful substances such as plastics.

U.S. Pat. No. 5,108,565 shows a method of removing harmful gas from a refuse combustion exhaust gas by atomizing an alkaline material within a reactor, and applying radiation simultaneously, thereby causing a reaction between the gas and the alkaline material, and recovering a salt produced by the reaction. However, the construction of concrete shielding over the large atomizing reactor is too expensive. And this method exhausts unnecessary energy which is absorbed by $Ca(OH)_2$ slurry. Furthermore, electron beam energy efficiency is not good and the temperature of electron beam window is increased since sprayed $Ca(OH)_2$ slurry covers the electron beam window which is made of titanium foil. In addition to the above problems, electron beam window and gasket for fixing the above window with electron beam accelerator are liable to be deformed by high temperature.

SUMMARY OF THE INVENTION

It is an object of the present invention to solve the above problem, and to provide an improved method for removing harmful gases in the incinerator effluent gas.

Other objects and advantages of the present invention become apparent to those skilled in the art from the following description and disclosure.

DETAILED DESCRIPTION OF THE INVENTION

The present invention includes two major steps. The former step is irradiating an electron beam and the latter is atomizing an alkaline material thereby reacting with the activated harmful substances. In an electron beam accelerator, an incinerator effluent gas is irradiated by an electron beam causing harmful substances in the effluent gas to change into the intermediates that could react with an alkaline material.

The treated effluent gas by irradiating an electron beam reacts with atomized alkaline materials thereby producing solid-state salts. The solid-state salts are removed from effluent gas dust collector or an electrostatic precipitator, and the purified effluent gas is diffused to the air through a funnel. In the electron beam irradiation reactor, harmful substances in effluent gas are activated directly by irradiation or water contained in effluent gas is radicalized by irradiation and then these radicals from water react with harmful substances in effluent gas to convert them to the activated intermediates. In detail, sulfurous acid gas is converted to sulfuric acid which is reactable with calcium hydroxide. Nitric oxides are converted to nitric acid which is reactable with calcium hydroxide. And hydrogen chloride is converted to more activated form by electron beam irradiation or by reacting with other radicals.

The following reactions occur in electron beam irradiation reactor:

(1) radical formation reaction;

$$O_2 \Longrightarrow O^* + O^*$$

$$O_2 + O^* \Longrightarrow O_3$$

$$H_2O + O^* \Longrightarrow 2OH$$

$$OH + O^* \Longrightarrow HO_2^*$$

(2) Reaction of hydrogen chloride;

$$HCl + O_3^* \Longrightarrow HCl^* + O_3$$

$$HCl + 2O^* \Longrightarrow HCl^* + O_2$$

(3) Reaction of sulfur oxides;

$$SO_2 + O^* \Longrightarrow SO_3$$

$$SO_2 + OH^* \Longrightarrow SO_3 + H^*$$

$$SO_2 + HO_2^* \Longrightarrow SO_3 + HO^*$$

$$SO_2 + H_2O \Longrightarrow H_2SO_4$$

(4) Reaction of nitrogen oxides;

$$NO_2 + O^* \Longrightarrow NO_2$$

$$NO + OH^* \Longrightarrow HNO_3$$

$$NO + HO_2^* \Longrightarrow NO_2 + OH$$

$$2HNO_2 \Longrightarrow NO + NO_2 + H_2O$$

$$NO_2 + OH^* \Longrightarrow HNO_3$$

Sulfuric acid, nitric acid and activated hydrogen chloride from sulfur oxides, nitric oxides and hydrogen chloride in effluent gas generated in an electron beam reactor is reacted with atomized alkaline material such as calcium hydroxide to produce solid state salts. The salts made in an atomizing reactor are removed by a dust collector or an electrostatic precipitator. Thus, the purified effluent gas treated by the method of the present invention is diffused to the air through a funnel.

In an atomizing reactor which is known as a spray dryer, the following reactions occur;

$$2HCl^* + Ca(OH)_2 \Longrightarrow CaCl_2.H_2O + H_2O$$

$$4HCl^* + 2Ca(OH)_2 \Longrightarrow CaCl_2.Ca(OH)_2.H_2O + H_2O$$

$$H_2SO_4 + Ca(OH)_2 \Longrightarrow CaSO_4 + 2H_2O$$

$$2HNO_3 + Ca(OH)_2 \Longrightarrow Ca(NO_3)_2 + H_2O$$

An alkaline material used in the present invention is calcium hydroxide slurry, which is made by mixing calcium hydroxide dry powder and water in the ratio of 0.1:1 to 0.45:1. The calcium hydroxide slurry is sprayed and atomized to react with harmful substances which are irradiated by electron beam radiation in order to remove harmful substances from incinerator effluent gas.

Since nitric acid, sulfuric acid and activated hydrogen chloride generated from irradiation step in electron beam reactor are all in a gaseous state, there is no obstacle interrupting irradiation from electron beam accelerating device to effluent gas, and the radiation energy efficiency is improved considerably.

In detail, electron beam irradiation step is followed by alkaline material atomizing step in the present invention. Since irradiation step and alkaline material atomizing step is conducted in different time and in different reactors, the construction cost of X-ray shielding concrete is decreased remarkably.

It is important to control the dose of radiation energy dependent on the concentrations of harmful substances contained in an incinerator effluent gas.

When analyzing effluent gas from outlet of electron beam reactor if sulfurous acid gas and $NO_x$ is not sufficiently removed, it is necessary to supply more electric power in order to increase electron beam irradiation.

If sulfurous acid gas is sufficiently removed but $NO_x$ is remained, irradiation with electron beam is too strong. Since excess irradiated electron beam resolves nitrogen gas to form another nitrogen oxides of NO, $NO_2$, Or $N_2O$, it is necessary to reduce irradiating electron beam.

Water is more likely to be irradiated than harmful substances in effluent gas. Thus, the harmful substances in effluent gas is likely to be removed indirectly by reacting with radicals or activated water. If the humidity of incinerator effluent gas is more than 100 g/Nm$^3$ in dry basis(in absolute humidity, it is about 8%), harmful substances are efficiently removed by electron beam irradiation. If the humidity of effluent gas in electron beam reactors is not sufficient, adequate amount of steam is to be added.

As mentioned above, it is necessary to increase irradiation energy if sulfurous acid gas and $NO_x$ is not removed. In spite of increasing the irradiation energy, if the concentration of sulfurous acid and $NO_x$ is not decreased, the humidity of effluent gas is to be adjusted to more than 100 g/Nm$^3$ and less than 200 g/Nm$^3$ by supplying steam at 110° C. to 250° C. to the top portion of electron beam reactor.

If, the humidity is more than 200 g/Nm$^3$, some troubles are caused in operating the filtration step with a dust collector or an electrostatic precipitator.

And, the temperature of the steam is preferably mole or less than 10° C. from the temperature of the effluent gas, which does not cause complicated problems in operating an electron beam reactor.

A part of electron beam irradiated oxygen in electron beam reactor is converted to ozone. The ozone generated in electron beam reactor flows to atomizing reactor by a fan, and to be removed by reacting with Ca(OH)$_2$ slurry. Since electron beam used in effluent gas treatment generates fatal level of X-ray, X-ray shielding thick concrete wall is necessary. Actually, the method of U.S. Pat. No. 5,108,565 needs to construct very expensive shielding wall in order to shield over the large scale spraying reactor. In the present invention, relatively small scale of shielding wall is needed.

As a result, it is possible to realize a space-saving equipment, a reduction of required energy, a simple operation controlling, and a prevention of occurrence of secondary environment pollution.

BRIEF DESCRIPTION OF THE DRAWINGS

The accompanying drawing, which is incorporated and constitutes a part of the specification, illustrates a presently preferred embodiment of the invention and the detailed description given below, serves to explain the principles of the invention.

DESCRIPTION OF THE PREFERED EMBODYMENTS

The sample of effluent gas was from the pilot plant of the municipal waste incinerator in order to develop the fluidized bed incinerator. The capacity of the pilot plant was 3,000 Kg/day of municipal waste or coal. The pilot plant was able to make effluent gas more than 900 Nm$^3$/hr. The composition of effluent gas was 69% of $N_2$, 8% of $O_2$, 11% of $CO_2$, 12% of $H_2O$, 400~800 ppm of HCl, 100~300 ppm of $SO_2$, and 50~200 ppm of $NO_x$ by weight %. And, the flow rate of an effluent gas fox experiments was 400 Nm$^3$/hr.

[EXAMPLE 1]

Figure 1:
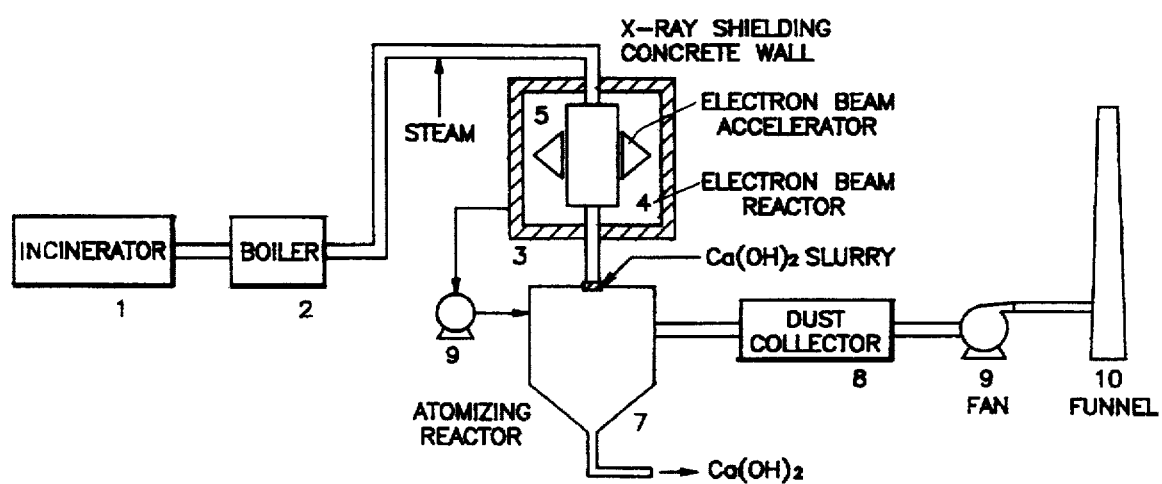
FIG. 1 is a flow chart including a device for realizing the method of the present invention.
Figure 2:
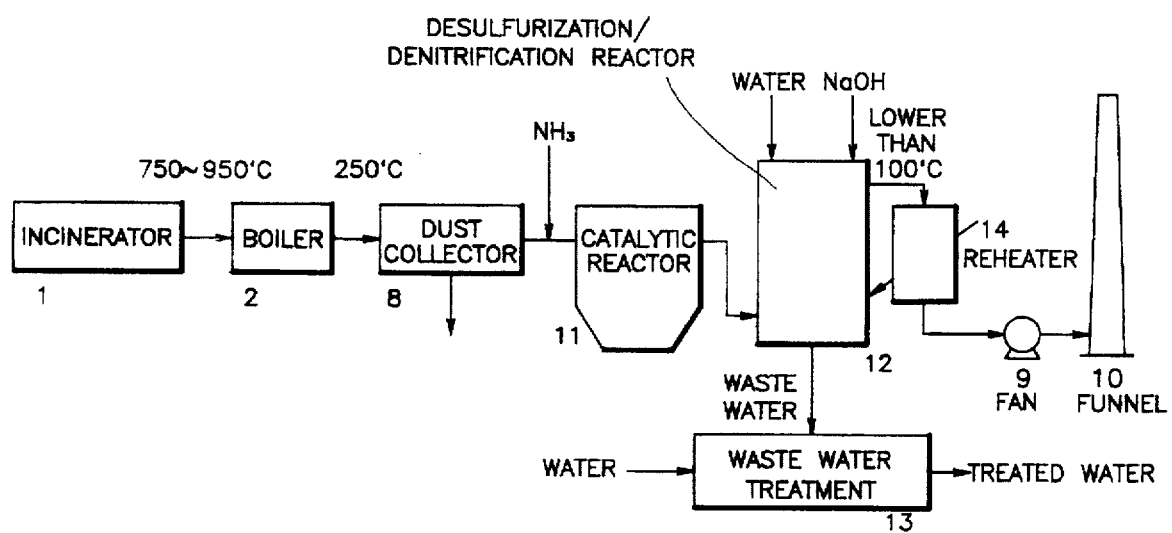
FIG. 2 and 3 are flow charts for showing the different conventional methods for removing harmful gas in the incinerator effluent gas.
Figure 3:
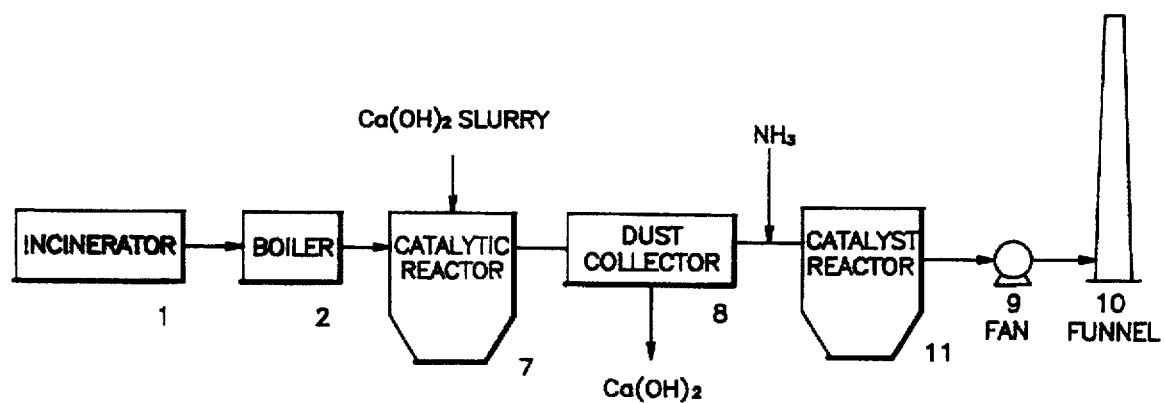

The experimental system shown in FIG. 1 was adjusted so that the temperature of the effluent gas generated in the boiler 2 and introduced to the electron beam reactor was 140° C. at the top portion of the electron beam reactor. The concentrations of $SO_2$, $NO_x$ and HCl in the effluent gas were 200 ppm, 150 ppm and 800 ppm, respectively. A steam of 140° C. was added to adjust the humidity of the effluent gas to 12% in dry basis. The effluent gas was irradiated with electron beam which dose was 12 Kgray in the electron beam reactor 4. And then, radicalized or activated substances in the effluent gas were introduced to an atomizing reactor 7, thereby reacting with various amounts of atomized and sprayed Ca(OH)$_2$ slurry.

In these results, HCl was not removed with electron beam irradiation. More than 90% of HCl was removed from reaction with Ca(OH)$_2$ slurry. If a small amount of 1% NaOH was added to Ca(OH)$_2$ slurry, the removal rate of HCl was increased.

Figure 4:
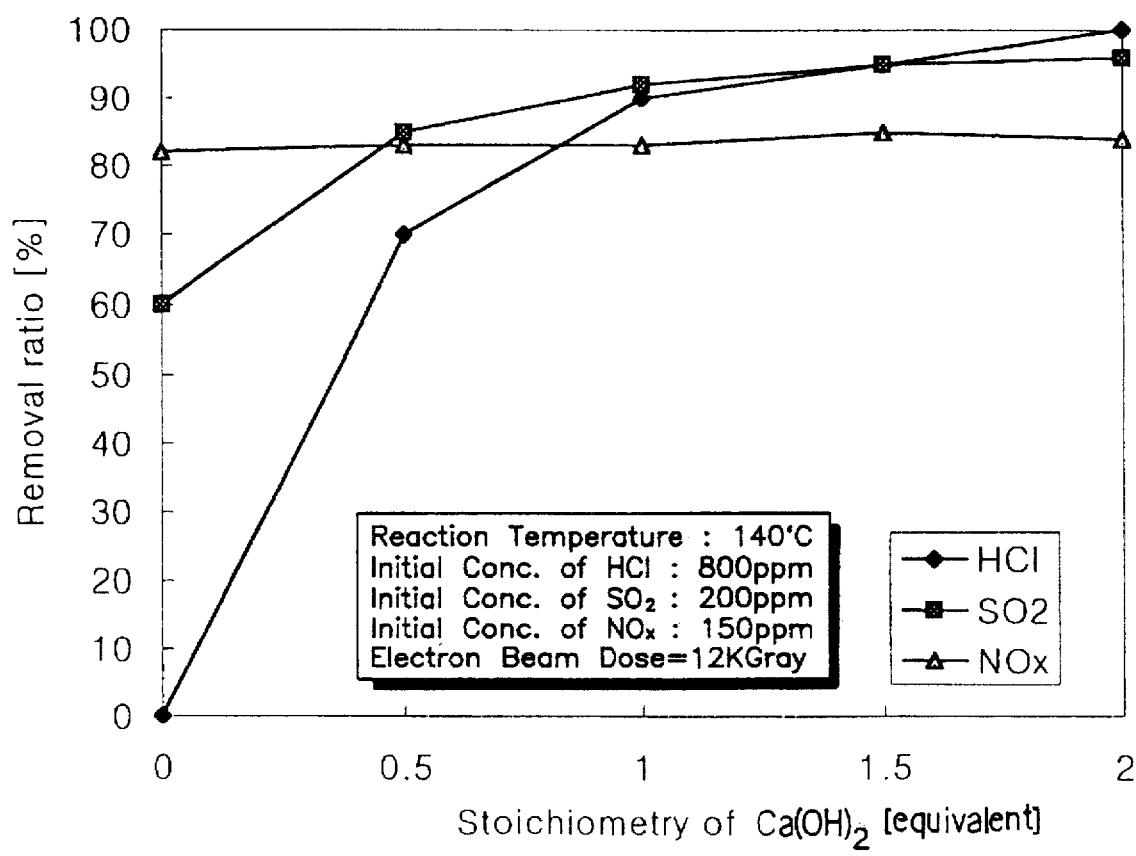
FIG. 4 is a diagram for showing the removal ratio(%) of $NO_x$, $SO_2$ and HCl with spraying atomized Ca(OH)$_2$ in various amounts of Ca(OH)$_2$.

The experiment was conducted in various amount of Ca(OH)$_2$ slurry. 60% of the $SO_2$ was removed when adding no atomized Ca(OH) slurry. About 95% of the $SO_2$ was removed from the effluent gas when reacted with 1.5 equivalent of Ca(OH)$_2$. The results of these experiments are shown in FIG. 4

[EXAMPLE 2]

Figure 5:
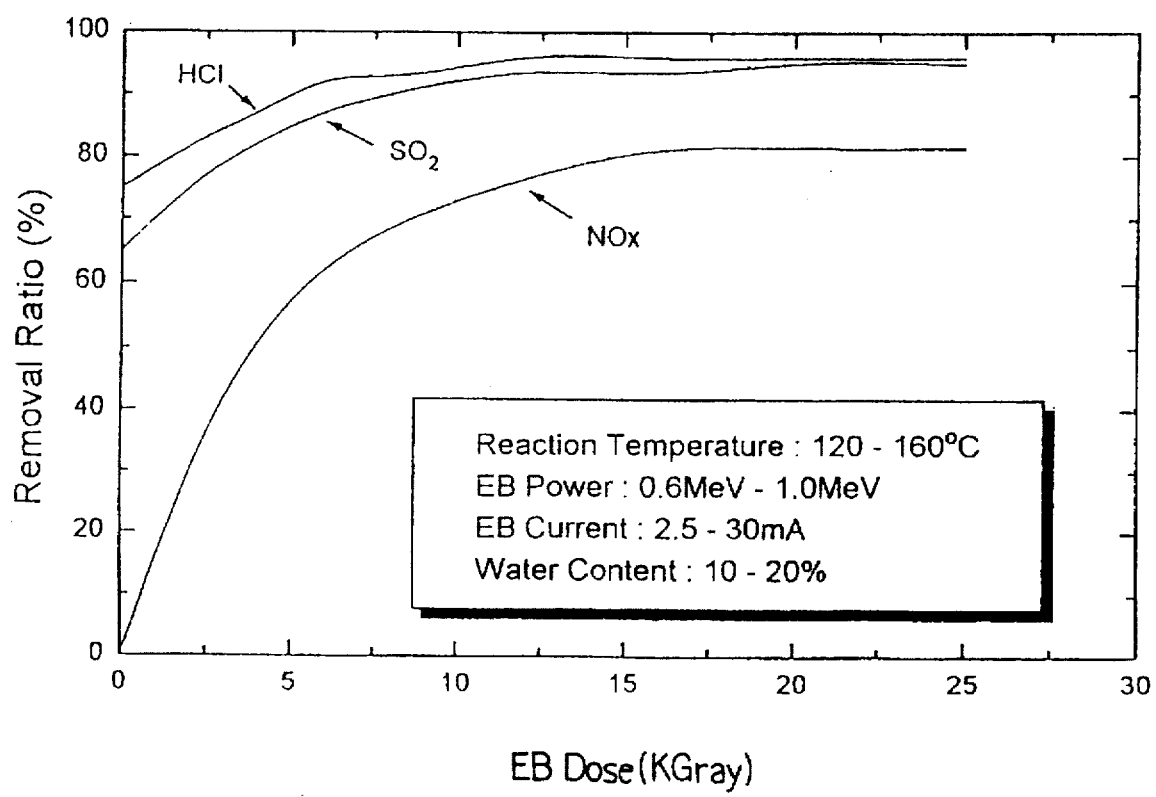
FIG. 5 is a diagram for showing the removal ratio(%) of HCl, $SO_2$ and $NO_x$ in various amount of electron beam power.

The experimental system shown in FIG. 1 was adjusted so that the temperature of the effluent gas generated in the boiler 2 and introduced to the electron beam reactor was 140° C. at the top portion of the electron beam reactor. The concentrations of $SO_2$, $NO_x$ and HCl in the effluent gas were 150 ppm, 150 ppm and 400 ppm, respectively. A steam of 140° C. was added to adjust the humidity of the effluent gas to 12% in dry basis. The effluent gas was irradiated with electron beam in various amount of electron beam power from 0 KW to 25 KW. And then the effluent gas was introduced to an atomizing reactor 7, thereby reacting with 1.5 equivalent of Ca(OH)$_2$ slurry. When electron beam dose was 0, about 60% of more than 70% of $NO_x$, 90% of HCl and $SO_2$ were removed with electron beam dose of 12 KGray. The preferable humidity of the effluent gas within the electron beam reactor is about 100 g/Nm$^3$ to 200 g/Nm$^3$ in dry basis. Even though an electron beam reactor and an atomizing reactors is separated, the removing rate of the air pollutants are improved. The results of these experiments are shown in FIG. 5.

We claim:

1. A method of removing harmful substances from an effluent gas using irradiation, comprising the steps of:

(a) supplying an incinerator effluent gas into an electron beam reactor;

(b) supplying steam into a top portion of the electron beam reactor to adjust humidity of the incinerator effluent gas in dry basis in the electron beam reactor to more than 100 g/Nm$^3$ and less than 200 g/Nm$^3$;

(c) applying an electron beam radiated from an electron accelerator to the incinerator effluent gas in the electron beam reactor to activate substances and water which are included in the effluent gas;

(d) atomizing an alkaline material into the irradiated effluent gas from (c) in an atomizing reactor to cause a reaction between said effluent gas and said alkaline material; and (e) recovering salts produced by the reaction.

2. A method according to claim 1, wherein said alkaline material is a calcium hydroxide slurry made by mixing calcium hydroxide dry powder:water in the ratio of 0.1:1 to 0.45:1.

3. A method according to claim 2, wherein said calcium hydroxide slurry has a concentration of 1.5 equivalent.

4. A method according to claim 1, wherein said steam has a temperature from 110° C. to 200° C.

5. A method according to claim 1, wherein said steam has a temperature which is no more than about 10° C. from a temperature of the effluent gas.

6. A method according to claim 1, wherein when concentrations of sulfurous acid and NO$_x$ measured at an outlet of the electron beam reactor is more than normality, power supply into the electron accelerator is increased.

7. A method according to claim 1, wherein when concentration of NO$_x$ measured at an outlet of the electron beam reactor is more than normality, power supply into the electron accelerator is decreased.

8. A method of removing harmful substances from an effluent gas using irradiation, comprising the steps of:

(a) supplying an incinerator effluent gas into an electron beam reactor;

(b) supplying steam from a boiler into a top portion of the electron beam reactor to adjust the humidity of the incinerator effluent gas in the electron beam reactor;

(c) applying an electron beam radiated from an electron accelerator to the incinerator effluent gas in the electron beam reactor to activate substances and water which are included in the effluent gas;

(d) atomizing an alkaline material into the irradiated effluent gas from (c) in an atomizing reactor to cause a reaction between said effluent gas and said alkaline material; and (e) recovering salts produced by the reaction.

9. A method according to claim 8, wherein humidity of the incinerator effluent gas in the electron beam reactor is more than 100 g/Nm$^3$ and less than 200 g/Nm$^3$ in dry basis.

10. A method according to claim 8, wherein said alkaline material is a calcium hydroxide slurry made by mixing calcium hydroxide dry powder:water in the ratio of 0.1:1 to 0.45:1.

11. A method according to claim 10, wherein said calcium hydroxide slurry has a concentration of 1.5 equivalent.

12. A method according to claim 8, wherein said steam has a temperature from 110° C. to 200° C.

13. A method according to claim 8, wherein when concentrations of sulfurous acid and NO$_x$ measured at an outlet of the electron beam reactor is more than normality, power supply into the electron accelerator is increased.

14. A method according to claim 8, wherein when concentration of NO$_x$ measured at an outlet of the electron beam reactor is more than normality, power supply into the electron accelerator is decreased.

* * * * *